United States Patent
Jeong et al.

(10) Patent No.: US 6,795,634 B2
(45) Date of Patent: Sep. 21, 2004

(54) OPTICAL FIBER BLOCK HAVING HOLDING SUB-BLOCK

(75) Inventors: Byung-Gil Jeong, Taegukwangyok-shi (KR); Seung-Wan Lee, Suwon-shi (KR); Hyun-Chae Song, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/305,487

(22) Filed: Nov. 27, 2002

(65) Prior Publication Data

US 2003/0133689 A1 Jul. 17, 2003

(30) Foreign Application Priority Data

Dec. 27, 2001 (KR) .................................. 10-2001-85804

(51) Int. Cl.[7] ................................................. G02B 6/00
(52) U.S. Cl. ...................................................... 385/137
(58) Field of Search ................................. 385/135–137

(56) References Cited

U.S. PATENT DOCUMENTS

2002/0076189 A1 * 6/2002 McMullin et al. .......... 385/137
2002/0154865 A1 * 10/2002 Lasecki et al. ............... 385/52

* cited by examiner

Primary Examiner—Khiem Nguyen
(74) Attorney, Agent, or Firm—Cha & Reiter, L.L.C.

(57) ABSTRACT

Disclosed is an optical fiber block having holding sub-blocks. The optical fiber block comprises: an optical fiber arrangement section having a V-groove array including a plurality of V-grooves; a stress-relieving recess section extending from the optical fiber arrangement section, the stress-relieving recess section having a flat surface on which a ribbon optical fiber is fixed, the flat surface being formed to be substantially lower than the lower ends of the V-grooves by etching; and at least one holding sub-block formed on a rear portion of the side edge of the flat surface of the stress-relieving recess section, so as to prevent the ribbon optical fiber placed on the flat surface from escaping out of the flat surface and guide the flow of epoxy resin injected toward the ribbon optical fiber.

6 Claims, 7 Drawing Sheets

What is claimed is:

OPTICAL FIBER BLOCK HAVING HOLDING SUB-BLOCK

CLAIM OF PRIORITY

This application claims priority to an application entitled "OPTICAL FIBER BLOCK HAVING HOLDING SUB-BLOCK" filed in the Korean Industrial Property Office on Dec. 27, 2001 and assigned Serial No. 2001-85804, the contents of which are hereby incorporated by reference.

BACKGROUND OF THE INVENTION

1. Field of the Invention

The present invention relates to an optical fiber block which enables a planar lightwave circuit and optical fibers to be connected with each other in an aligned state, and more particularly to an optical fiber block having holding sub-blocks.

2. Description of the Related Art

A planar lightwave circuit is widely used in processing an optical signal, for example, in branching, modulating, switching, or multiplexing an optical signal. An optical fiber block is employed in order to connect at least one optical fiber with the planar lightwave circuit in an aligned position. As one skilled in the art can appreciate, the optical fiber block is made from silicon and manufactured through a wet etching technique.

Figure 1:
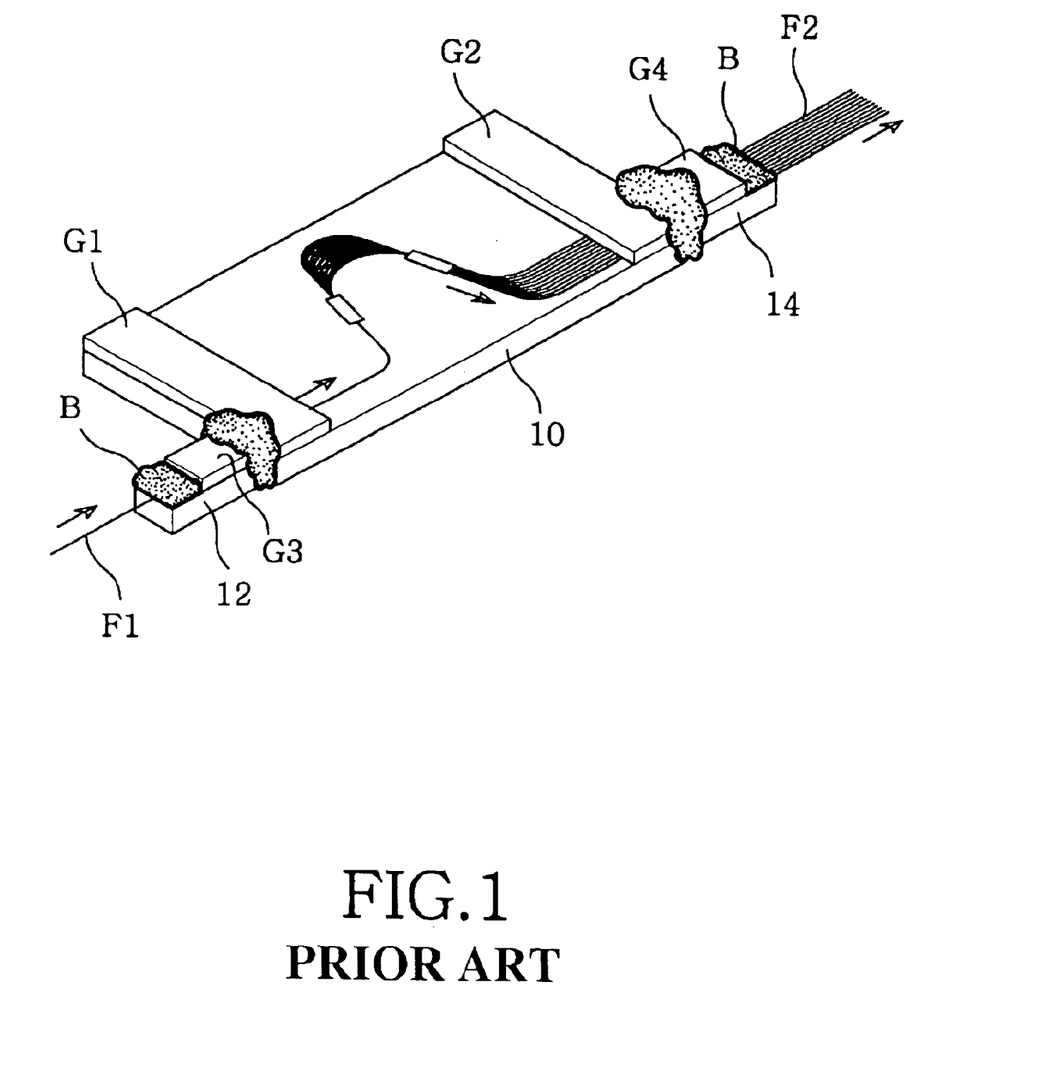
FIG. 1 is a perspective view illustrating the connections between a planar lightwave circuit and input and output optical fiber blocks.

FIG. 1 is a perspective view of the connections between a planar lightwave circuit 10 and input and output optical fiber blocks 12 and 14. As shown in FIG. 1, the input and output optical fiber blocks 12 and 14 connect the planar lightwave circuit 10 to a single optical fiber F1, an optical fiber bundle (or a ribbon optical fiber) F2, respectively. An optical signal having N number of wavelengths is inputted through the single optical fiber F1 to an input port of the planar lightwave circuit 10, then the optical signal passes the planar lightwave circuit 10 and outputted through the ribbon optical fiber F2. The input and output optical fiber blocks 12 and 14 couples the optical fibers in an aligned state by means of adhesive agent such as epoxy resin. Further, glass covers G1 and G2 are attached to the input and output sides of the planar lightwave circuit 10, respectively, to hold the aligned optical fiber blocks.

Figure 2:
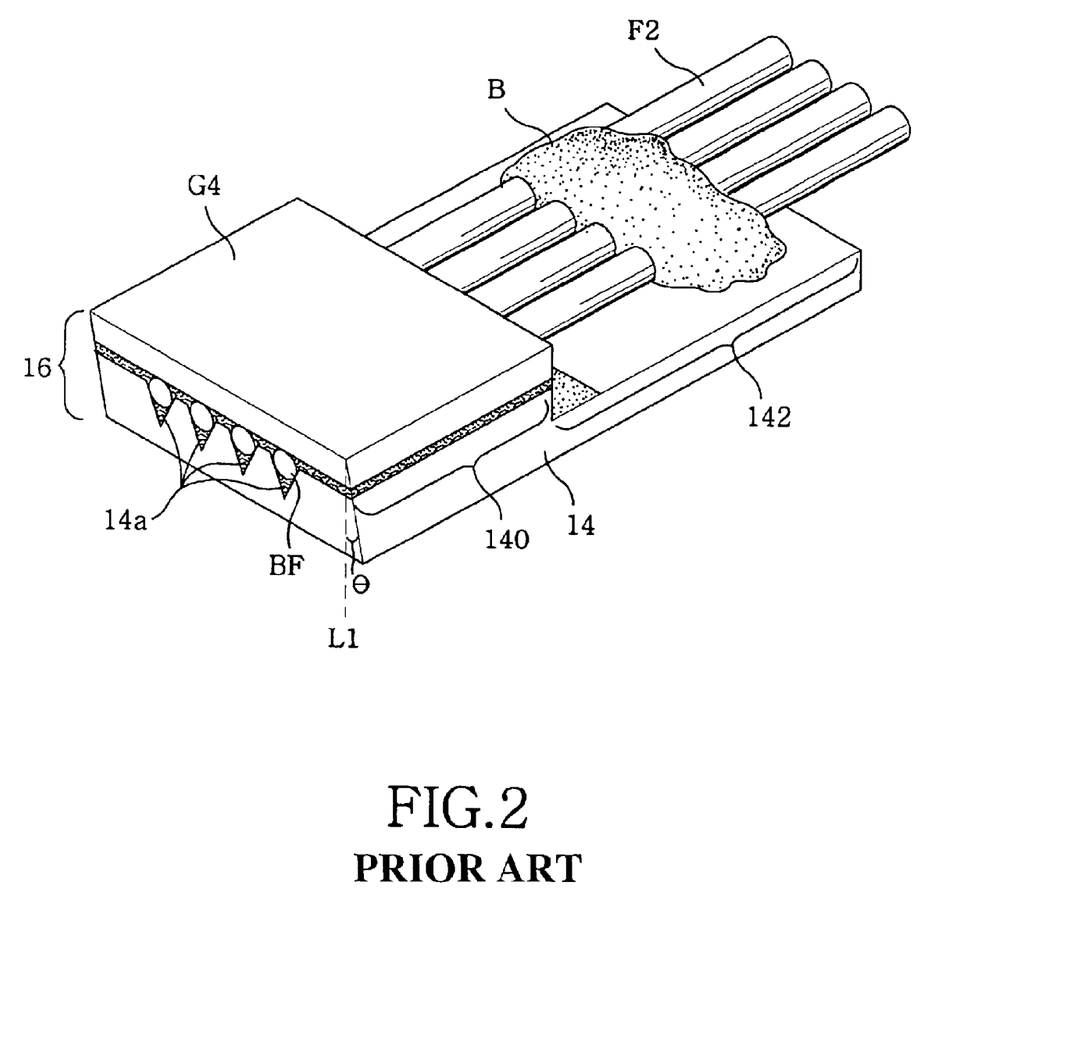
FIG. 2 is a perspective view showing a state in which optical fibers are aligned by means of a conventional optical fiber block and a glass cover.

FIG. 2 shows a state in which optical fibers are aligned by means of the optical fiber block 14 and the glass cover G4. As shown, an assembly of the optical fiber block 14 and the glass cover G4 has side surfaces configured to have an inclination θ with respect to the vertical line L1 by grinding process. That is, after the input and output optical fiber blocks 12 and the optical fiber block 14, and the glass cover G4 are assembled with each other but before they are coupled to the planar lightwave circuit 10, a grinding process is performed to provide side surfaces 16, which serves to reduce optical loss.

Figure 3:
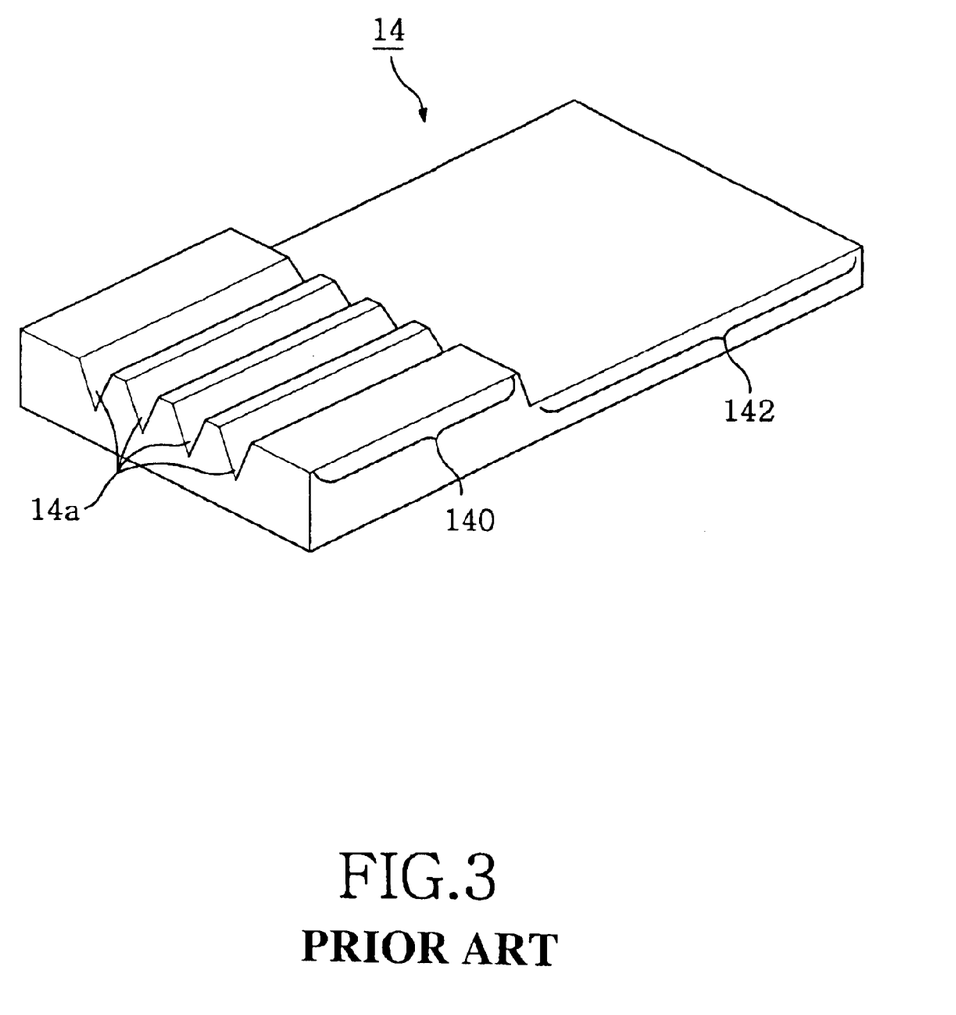
FIG. 3 is a perspective view of the conventional optical fiber block shown in FIG. 2.

Referring to FIG. 3, the optical fiber block 14 holds a four-core ribbon optical fiber, for example, and includes an optical fiber arrangement section 140 in which bare optical fibers with their coating stripped are arranged and a stress-relieving recess section 142 to prevent or reduce stress caused by the difference between the thickness of a bare section and a coated section of the ribbon optical fiber. The optical fiber arrangement section 140 includes an array of V-grooves in which the bare optical fibers are seated. The optical fiber arrangement section 140 and the stress-relieving recess section 142 are formed precisely using a wet etching technique.

Figure 4:
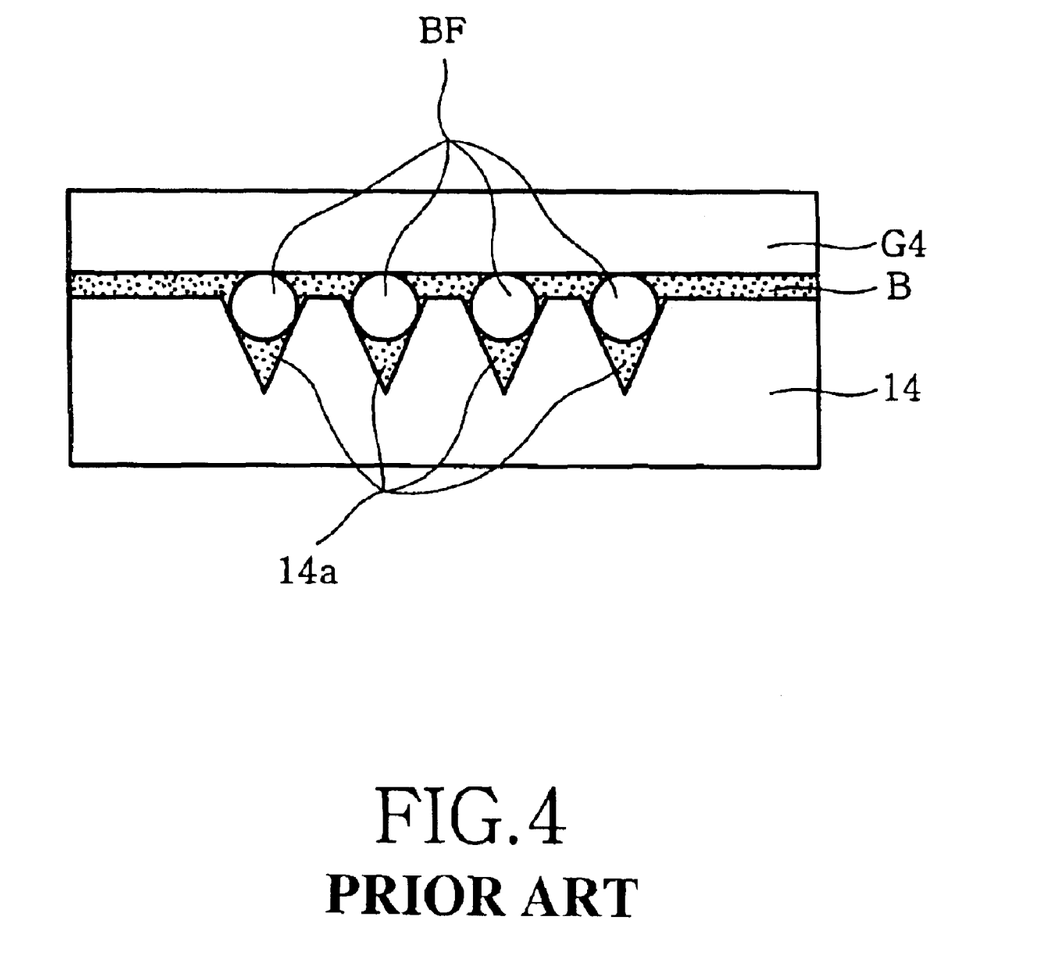
FIG. 4 is a side view of an assembly in which a ribbon optical fiber is fixed by the conventional optical fiber block shown in FIG. 2.

Referring to FIG. 4, the optical fiber block 14 having the construction described above holds the bare optical fibers BF seated in the V-grooves 14a, fixes the arrangement of the bare optical fibers BF, and maintains pitches between the bare optical fibers BF. For an optimal result, it is important to precisely manufacture the V-grooves 14a and glass cover G4 in the optical fiber block 14, and maintain the arrangement of the optical fibers by means of an adhesive agent B such as epoxy resin.

However, the conventional optical fiber block has the following drawbacks in connecting optical fibers with a planar lightwave circuit. First, the conventional optical fiber block is made from silicon, thus a silicon wafer for the conventional optical fiber block is always etched to have a predetermined shape due to the inherent characteristics and crystal construction of silicon according to a mask design. As such, when optical fibers are packaged, the optical fibers partly seated in V-grooves having a pitch of 127 μm tend to be partly placed out of the V-grooves. Therefore, the optical fibers may be held unstably by the optical fiber block, or the portion of the optical fibers seated in the V-grooves may be even separated out of the V-grooves. Further, since there is too much space between the optical fiber block and the glass cover, undesirable amount of epoxy resin are frequently injected to the space. As too much quantity of epoxy resin is injected to the space and onto the stress-relieving recess section, optical loss may increase. In fact, according to temperature change, the injected epoxy resin expands or contracts, so that the epoxy resin may be delaminated which in turn increase the optical loss of the optical fibers.

SUMMARY OF THE INVENTION

Accordingly, the present invention has been made to solve the above-mentioned problems occurring in the prior art and provide additional advantages by providing an optical fiber block having holding sub-blocks.

According to one aspect of the present invention, an optical fiber block having holding blocks can minimizes undesirable amount of epoxy resin applied during the manufacturing process.

According to another aspect of the invention, there is provided an optical fiber block comprising: an optical fiber arrangement section having a V-groove array having a plurality of V-grooves; a stress-relieving recess section extending from the optical fiber arrangement section, the stress-relieving recess section having a flat surface on which a ribbon optical fiber is fixed, the flat surface being formed to be lower than lower ends of the V-grooves by etching; and at least one holding sub-block formed on a rear portion of a side edge of the flat surface of the stress-relieving recess section to prevent the ribbon optical fiber placed on the flat surface from escaping out of the flat surface and help guide the flow of epoxy resin injected toward the ribbon optical fiber. The optical fiber block may comprise two holding sub-blocks formed on rear portions of both edges of the flat surface of the stress-relieving recess section, a seating space being formed between two holding sub-blocks, so that the two holding sub-blocks surround the ribbon optical fiber placed in the seating space and guide the flow of epoxy resin injected into the seating space toward the ribbon optical fiber.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. For the purposes of clarity and simplicity, a detailed description of known functions and configurations incorporated herein will be omitted as it may make the subject matter of the present invention rather unclear.

Figure 5:
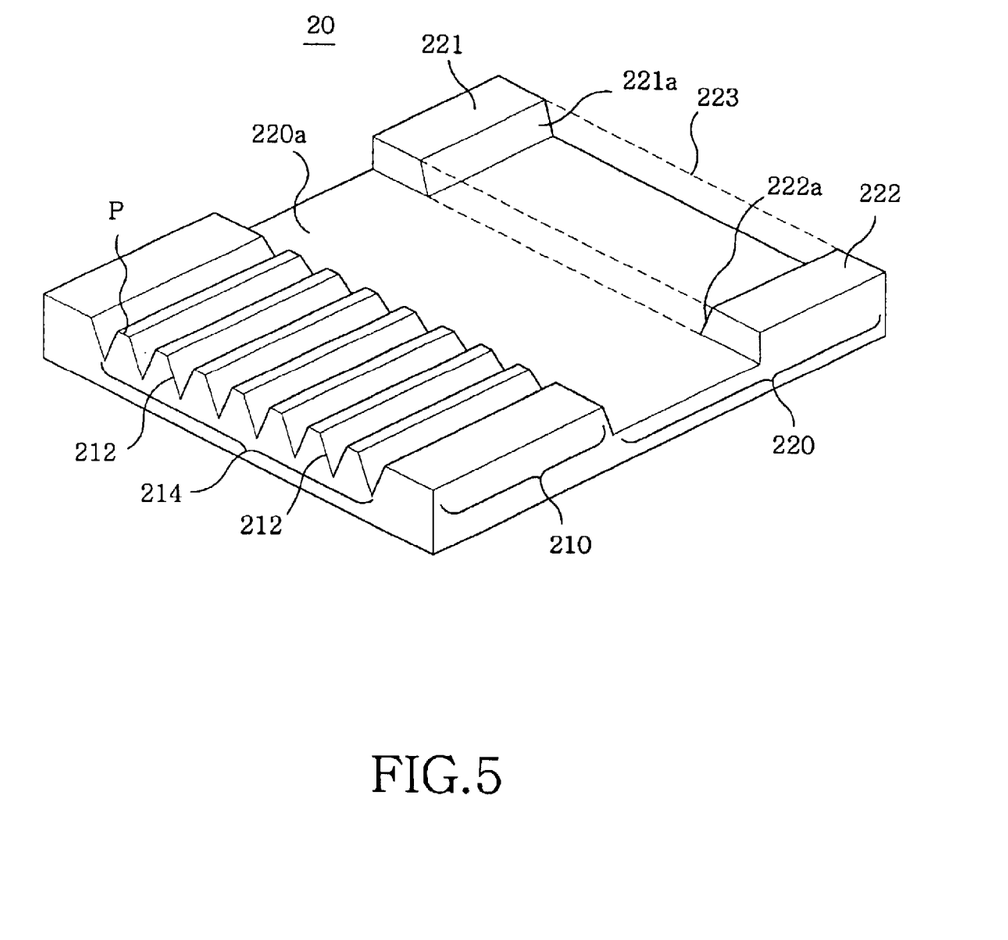
FIG. 5 is a perspective view of an optical fiber block 20 according to the present invention.

FIG. 5 is a perspective view of an optical fiber block 20 according to the present invention. As shown in FIG. 5, the optical fiber block 20 includes an optical fiber arrangement section 210, a stress-relieving recess section 220 extending from the optical fiber arrangement section 210, and holding sub-blocks 221 and 222 formed at one end of the stress-relieving recess section 220. The optical fiber arrangement section 210, the stress-relieving recess section 220, and the holding sub-blocks 221 and 222 are formed by wet-etching a silicon wafer by means of a photomask (not shown).

The optical fiber block 20 shown in FIG. 5 is an optical fiber block for holding an eight-core ribbon optical fiber. Although a limited number of ribbon optical fiber is shown in FIG. 5 for illustrative purposes, it is to be understood that the present invention can support a much larger number of ribbon fiber. Thus, the number of fibers in the drawing should not impose limitations on the scope of the invention.

In the embodiment, the optical fiber arrangement section 210 includes a V-groove array 214 consisting of eight V-grooves 212, which contain same pitch P between each of hem. The stress-relieving recess section 220 selectively etched to accommodate the coating thickness of the ribbon optical fiber, so that the bare optical fibers can be seated in the V-grooves 212 while the coated ribbon optical fiber is located on the stress-relieving recess section 220.

The stress-relieving recess section 220 has a flat surface 220a, and the holding sub-blocks 221 and 222 are formed on the rear portions of both edges of the flat surface 220a. The holding sub-blocks 221 and 222 are symmetrically disposed and faces each other. Further, the holding sub-blocks 221 and 222 protrude upward from the flat surface 220a, thus forming a seating space 223 for seating the ribbon optical fiber between the holding sub-blocks 221 and 222. Also, the holding sub-blocks 221 and 222 have slant surfaces 221a and 222a, respectively, which are facing each other.

When epoxy resin is injected in the state where the ribbon optical fiber is placed between the holding sub-blocks 221 and 222, the holding sub-blocks 221 and 222 guide a progressing direction of the injected epoxy resin. In addition, when the bare optical fibers are seated in the V-grooves 212, the holding sub-blocks 221 and 222 enable the ribbon optical fiber to smoothly slide down on the slant surfaces 221a and 222a into the seating space 223 between the holding sub-blocks 221 and 222, further enabling the bare optical fibers to be fixedly seated in the V-grooves 212. Further, even before the epoxy resin is injected, the holding sub-blocks 221 and 222 safely hold the ribbon optical fiber placed therebetween, thereby preventing the bare optical fibers from being separated from the V-grooves 212.

When the ribbon optical fiber is placed on the holding sub-block 222 and fixed by means of epoxy resin, the holding sub-blocks 221 and 222 guide the injected epoxy resin in a direction so as to enable the epoxy resin to surround the ribbon optical fiber as a result, the optical fiber block 20 helps to minimize the undesirable amount of the epoxy resin injected to fix the placed ribbon optical fiber, thereby minimizing adverse effect from contraction and expansion of the epoxy resin caused by the temperature change which in turn reduces optical loss.

Figure 6:
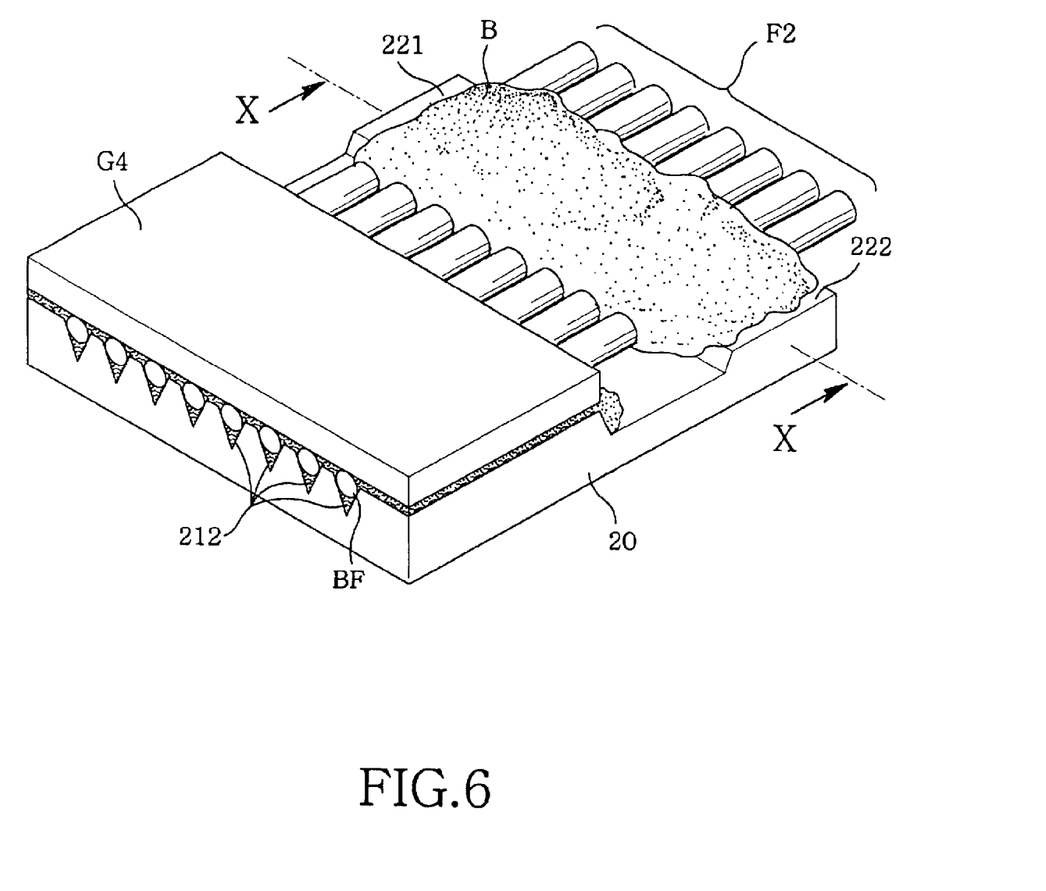
FIG. 6 is a perspective view of an assembly of the optical fiber block and a glass cover to which the optical fibers are fixed; and, FIG. 7 is a sectional view of the assembly shown in FIG. 6.
Figure 7:
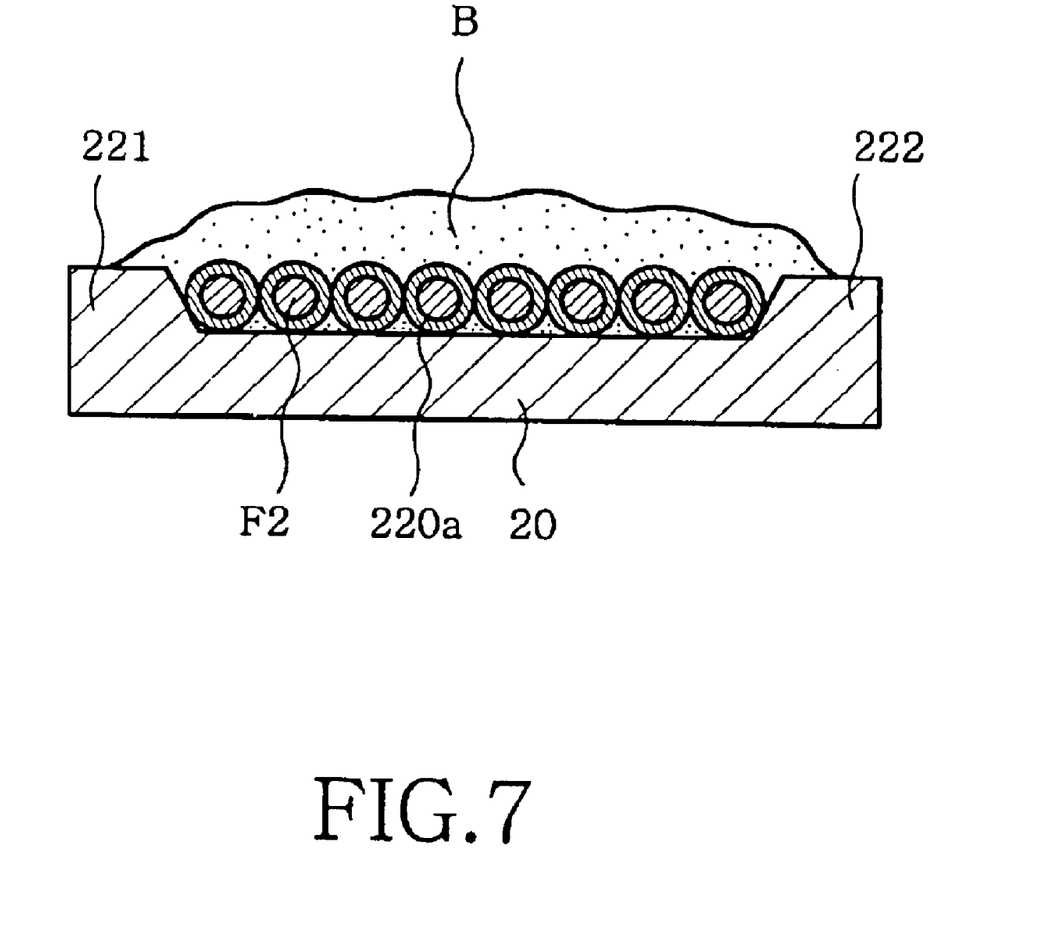

FIG. 6 is a perspective view of the assembly of the optical fiber block 20 and a glass cover G4 for holding optical fibers together, and FIG. 7 is a sectional view of the assembly shown in FIG. 6. As shown in FIGS. 6 and 7, the bare optical fibers BF are inserted between the optical fiber block 20 and the glass cover G4, and the ribbon optical fiber F2 is placed between the holding sub-blocks 221 and 222, and further secured by the adhesive agent B. Due to the configurations of the holding sub-blocks 221 and 222 as described above, the optical fiber block according to the present invention prevents a ribbon optical fiber placed on the stress-relieving recess section from moving, and minimizes or prevents separation or deflection of bare optical fibers, thereby facilitating the arrangement of bare optical fibers in V-grooves.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical fiber block comprising:

an optical fiber arrangement section having a plurality of V-grooves;

a stress-relieving recess section extending from the optical fiber arrangement section, the stress-relieving recess section having a flat surface on which a ribbon optical fiber is fixed; and, at least two holding sub-blocks formed at one end of the flat surface of the stress-relieving recess section for preventing the ribbon optical fiber placed on the flat surface from escaping out of the flat surface and for guiding a flow of epoxy resin injected toward the ribbon optical fiber, wherein the optical fiber block comprises at least two holding sub-blocks formed at edges of the flat surface of the stress-relieving recess section, defining a seating space between two holding sub-blocks for receiving the ribbon optical fiber thereto, thereby guiding a flow of epoxy resin injected into the seating space; and wherein each of the two sub-holding blocks comprises a slant surface, respectively, so that said slant surfaces face each other and slant downward toward an upper surface of the seating space.

2. The optical fiber block as claimed in claim 1, wherein the holding sub-blocks are symmetrically disposed on both side edges of the flat surface of the stress-relieving recess section.

3. The optical fiber block as claimed in claim 1, wherein the slanted surfaces of the holding sub-blocks provides the ribbon optical fiber to smoothly slide down between the holding sub-blocks.

4. The optical fiber block as claimed in claim 1, wherein the flat surface of the stress-relieving recess section is substantially lower than lower ends of the V-grooves.

5. The optical fiber block as claimed in claim 1, wherein the stress-relieving recess section is selectively etched to accommodate the ribbon optical fiber having a coating layer.

6. The optical fiber block as claimed in claim 1, further comprising a glass cover over the plurality of V-grooves having each of the ribbon optical fiber without a coating layer received thereon.

* * * * *